United States Patent
Vogel

(10) Patent No.: US 9,993,886 B2
(45) Date of Patent: Jun. 12, 2018

(54) METHOD AND DEVICE FOR THE FACE-SIDE CHAMFERING OF GEAR TEETH OF A WORKPIECE

(71) Applicant: Klingelnberg AG, Zürich (CH)

(72) Inventor: Olaf Vogel, Ettlingen (DE)

(73) Assignee: KLINGELNBERG AG (CH)

(*) Notice: Subject to any disclaimer, the term of this patent is extended or adjusted under 35 U.S.C. 154(b) by 324 days.

(21) Appl. No.: 14/733,548

(22) Filed: Jun. 8, 2015

(65) Prior Publication Data
US 2015/0360307 A1    Dec. 17, 2015

(30) Foreign Application Priority Data

Jun. 11, 2014 (EP) .................................... 14171953

(51) Int. Cl.
| | | |
|---|---|---|
| G06F 19/00 | (2018.01) | |
| B23F 19/10 | (2006.01) | |
| B23F 21/00 | (2006.01) | |
| B23F 21/12 | (2006.01) | |
| G05B 19/402 | (2006.01) | |

(52) U.S. Cl.
CPC .......... *B23F 19/102* (2013.01); *B23F 21/005* (2013.01); *B23F 21/12* (2013.01); *G05B 19/402* (2013.01); *G05B 2219/35491* (2013.01); *Y10T 409/101113* (2015.01)

(58) Field of Classification Search
None
See application file for complete search history.

(56) References Cited

U.S. PATENT DOCUMENTS

| | | | | |
|---|---|---|---|---|
| 2005/0000072 A1* | 1/2005 | Wolff | ...................... | B23F 19/10 |
| | | | | 29/56.5 |
| 2009/0060672 A1* | 3/2009 | Fitzgerald | ................. | B23C 3/12 |
| | | | | 409/31 |
| 2014/0234043 A1* | 8/2014 | Nakahara | ................... | B23F 5/20 |
| | | | | 409/12 |

FOREIGN PATENT DOCUMENTS

| | | | | |
|---|---|---|---|---|
| DE | 10230148 A1 * | 1/2004 | ............ | B23F 17/006 |
| DE | 203 20 294 U1 | 4/2004 | | |
| DE | 20 2005 011 790 U1 | 10/2005 | | |

(Continued)

OTHER PUBLICATIONS

Horst (Basic Guide to Deburring and Chamfering Gears, Gear Technology).*

(Continued)

*Primary Examiner* — Miranda Huang
*Assistant Examiner* — Hung Dang
(74) *Attorney, Agent, or Firm* — McCarter & English, LLP

(57) ABSTRACT

Method for the face-side chamfering of gear teeth of a workpiece (20) in a CNC-controlled multiaxis machine including inserting a tool (100) in the multiaxis machine, wherein the tool (100) has at least one cutting tooth (111) having a first rake face and a second rake face, driving the tool (100) in a first rotational direction, executing first CNC-controlled relative movements while the tool (100) rotates in the first rotational direction to chamfer a first face-side edge (24) of a first tooth of the gear teeth using the first rake face of the tool (100), and executing second CNC-controlled relative movements while the tool (100) rotates in the first rotational direction, to chamfer a second face-side edge (25) of the first tooth or another tooth of the gear teeth using the second rake face of the tool (100), and apparatus therefor.

11 Claims, 6 Drawing Sheets

(56) References Cited

FOREIGN PATENT DOCUMENTS

DE     202011050054 U1    9/2011
DE     102 30 148 A1    1/2014
JP      2012171020 A  *  9/2012  ............. B23F 5/163
KR   10-2013-0110673 A   10/2013

OTHER PUBLICATIONS

Klingelnberg AG, European Patent Application No. 14171953.4, European Search Report dated Dec. 10, 2014. 7 pages.
Carl Hanser Verlag, "Abdachen und Verzahnen in einer Aufspannung Herstellung von Zahnrädern und verzahnten Bauteilen." Werkstatt Und Betrieb, vol. 146, Issue 11, p. 56-57. Nov. 1, 2011.

* cited by examiner

Prior Art

METHOD AND DEVICE FOR THE FACE-SIDE CHAMFERING OF GEAR TEETH OF A WORKPIECE

CROSS-REFERENCE TO RELATED APPLICATIONS

This application claims priority under 35 U.S.C. §§ 119 (a)-(d) to European Patent Application No. 14 171 953.4, filed Jun. 11, 2014, which is hereby incorporated by reference in its entirety as part of the present disclosure as if fully set forth herein.

FIELD OF THE INVENTION

The subject matter of the invention is a method and an apparatus for the face-side chamfering of gear teeth of a workpiece.

BACKGROUND OF THE INVENTION

There are numerous methods for manufacturing gearwheels. In the case of chip-producing soft pre-machining one differentiates between hobbing, gear shaping, generating planing, and power skiving. Hobbing and power skiving are so-called continuous methods.

The power skiving method was revived some time ago. The foundations of this method are approximately 100 years old. In the case of power skiving, as shown in FIG. 1A, an axis intersection angle $\Sigma$ between the axis of rotation R1 of the power skiving tool 10 (also referred to as a skiving wheel) and the axis of rotation R2 of the workpiece 20, which is not equal to zero. The resulting relative movement between the power skiving tool 10 and the workpiece 20 is a spiral movement, which can be decomposed into a rotation component (rotational component) and a thrust component (translational component). A cylindrical helical drive can be considered to be a drive-technology analogy, wherein the rotating component corresponds to the rolling and the thrust component corresponds to the sliding of the flanks. The greater the absolute value of the axis intersection angle $\Sigma$, the more the translational movement component required for the machining of the workpiece 20 increases. Specifically, it causes a movement component of the cutting of the power skiving tool 10 in the direction of the two flanks of the workpiece 20. In the case of power skiving, the sliding component of the meshing relative movement of the engaged gear wheels of the helical wheel equivalent gearing is utilized to execute the cutting movement. In the case of power skiving, only a slow axial advance $s_{ax}$ in parallel to the axis of rotation R2 of the workpiece 20 is required and the so-called shaping movement is omitted, which is typical for gear shaping. Therefore, no reverse stroke movement also occurs during power skiving.

The cutting speed in the case of power skiving is directly influenced by the rotational speed of the power skiving tool 10 or the workpiece 20 and by the axis intersection angle $\Sigma$ used of the axes of rotation R1 and R2. The respective rotational movements are identified here with $\omega1$ and $\omega2$. The axis intersection angle $\Sigma$ and therefore the sliding component are to be selected so that an optimum cutting velocity is achieved for the machining of the material at given rotational speed.

The movement sequences and further details of a previously known power skiving method can be inferred from the above-mentioned schematic illustration in FIG. 1A. FIG. 1A shows the power skiving of external gear teeth on a cylindrical workpiece 20. The workpiece 20 and the tool 10 (a cylindrical power skiving tool 10 here) rotate in opposite directions, as can be seen in FIG. 1A, for example, on the basis of the angular velocities $\omega1$ and $\omega2$.

Further relative movements also take place. The above-mentioned axial advance $s_{ax}$ is necessary to be able to machine the entire gear teeth width of the workpiece 20 using the tool 10. The axial advance causes a displacement of the tool 10 in relation to the workpiece 20 in the parallel direction to the axis of rotation R2 of the workpiece 20. The direction of this movement of the tool 10 is identified in FIG. 1A with $s_{ax}$. If helical gear teeth are desired on the workpiece 20 (i.e., $\beta2 \neq 0$), a differential advance $s_D$ is superimposed on the axial advance $s_{ax}$, which, as shown in FIG. 1A, corresponds to an additional rotation of the workpiece 20 around its axis of rotation R2. The differential advance $s_D$ and the axial advance $s_{ax}$ are adapted to one another at the design point such that the resulting advance of the tool 10 in relation to the workpiece 20 takes place in the direction of the tooth gap to be created. In addition, a radial advance $s_{rad}$ can be used, for example, to influence the crowning of the gear teeth of the workpiece 20.

In the case of power skiving, the vector of the cutting velocity $v_c$ essentially results as the difference of the two velocity vectors $v_1$ and $v_2$, which are inclined to one another by the axis intersection angle $\Sigma$, of the axes of rotation R1, R2 of tool 10 and workpiece 20. $v_1$ is the velocity vector on the circumference of the tool 10 and $v_2$ is the velocity vector on the circumference of the workpiece 20. The cutting velocity $v_c$ of the power skiving process can be varied by the axis intersection angle $\Sigma$ and the rotational speed in the helical wheel equivalent gearing. The relatively slow axial advance $s_{ax}$, as already mentioned, only has a small influence on the cutting velocity $v_c$ in the power skiving method, which can be neglected. The axial advance $s_{ax}$ is therefore not considered in the vector diagram with the vectors $v_1$, $v_2$, and $v_c$ in FIG. 1A.

FIG. 1B shows the power skiving of external gear teeth of a workpiece 20 using a conical power skiving tool 10. FIG. 1B again shows the axis intersection angle $\Sigma$, the vector of the cutting velocity $v_c$, the velocity vectors $v_1$ on the circumference of the tool 10 and $v_2$ on the circumference of the workpiece 20, and the angle of inclination $\beta1$ of the tool 10 and the angle of inclination $\beta2$ of the workpiece 20. The angle of inclination $\beta2$ is not equal to zero here. The tooth head of the tool 10 is identified with the reference sign 4 in FIG. 1B. The tooth face is identified in FIG. 1B with the reference sign 5. The two axes of rotation R1 and R2 do not intersect, but rather are arranged skewed in relation to one another. In a conical power skiving tool 10, the design point AP is typically selected on the shared perpendicular of the two axes of rotation R1 and R2, since tilting of the power skiving tool 10 to provide clearance angles is not necessary. The design point AP is coincident here with the so-called touch point BP. The pitch circles of the helical wheel equivalent gearing touch in this design point AP.

During the chip-generating production of gearwheels on the workpiece, respective face-side edges result in the transition regions of the two flanks to the face plane, which can sometimes be very sharp and clearly pronounced. These edges are typically chamfered in a separate method step. There are very differing approaches to bring about the chamfering of such edges during the manufacturing of gear teeth.

Process-related burrs sometimes also arise in the edge region, which are removed in a machining step by so-called deburring.

Chamfering and deburring are equivalent processes, since frequently, the movement sequences are identical or nearly identical. The tools also do not necessarily have to differ from one another. Therefore, chamfering is always referred to hereafter, wherein deburring is also subsumed under this designation herein.

Special tools are sometimes used for chamfering, which either must be chucked in a machine in a separate method step before such a tool is used, or a separate axis having a special tool for chamfering is provided in the machine. To be able to chamfer both the right and also the left flanks in the edge region, quite complex movement sequences (relative movements between tool and workpiece) are sometimes necessary. In addition, in the case of power skiving, a rotational direction reversal usually has to be performed after the left flanks have been chamfered using a tool, for example. The chamfering of the right flanks can then only be performed after the rotational direction reversal. Such a rotational direction reversal is time-consuming and results in longer processing times. In particular for mass production, however, it would be desirable to shorten the processing times.

SUMMARY OF THE INVENTION

The object of the present invention is therefore to provide a method and an apparatus for chamfering workpieces, which enables shorter processing times.

This object is achieved by a method similar to power skiving, which enables the right and left flanks to be chamfered without a rotational direction reversal. In addition, a correspondingly optimized apparatus is provided as a special tool.

In various embodiments, a special tool in a CNC-controlled multiaxis machine is used for this purpose, which has at least one cutting tooth having a first rake face and a second rake face.

For the chamfering, the following steps may then be executed using this special tool:
 driving the special tool in a first rotational direction,
 executing CNC-controlled relative movements while the tool rotates in the first rotational direction, to chamfer a first edge of a first tooth of the gear teeth using the first rake face of the tool,
 executing CNC-controlled relative movements while the tool rotates (further) in the first rotational direction, to chamfer a second edge of the first tooth of the gear teeth using the second rake face of the tool.

The chamfering of the first edge(s) is performed in a first machine setting and the chamfering of the second edge(s) is performed in a second machine setting. That is to say, the machine setting is changed in an intermediate step.

Methods according to the invention is suitable in particular for the face-side chamfering of gear teeth in a process similar to power skiving, wherein no rotational direction reversal is required to be able to chamfer right and left flanks.

A method is referred to as a continuous process similar to power skiving here, if an axis intersection angle between the axis of rotation of the special tool and the axis of rotation of the workpiece, which is not equal to zero, is predefined by the machine setting.

In various embodiments, such a process similar to power skiving always has a resulting relative movement between the special tool and the workpiece, which can be decomposed into a rotation component (rotational component) and a thrust component (translational component).

The sliding component may optionally be utilized to execute the cutting movement required for the chamfering.

In the chamfering, the following movement(s) may be executed:
 i. Only radial plunging of the special tool on the workpiece at the correct component height and the edge is completely chamfered. The special tool can then be withdrawn from the tooth gap again.
 ii. Or plunging the special tool from "above" the gear teeth on the workpiece (axial guiding of the special tool toward the workpiece) and executing a small axial movement until the edge is completely chamfered.
 iii. In various embodiments, these two movement approaches i. and ii can also be combined with one another.

The chamfering, which is similar to power skiving, is a continuous process, during which the cutting tooth or cutting teeth of the special tool chamfer(s) all right flanks in succession, for example, before the machine setting is changed and then all left flanks are chamfered. However, a deburring method is described hereafter on the basis of face-side edges.

Methods according to the invention can be carried out in the context of both dry machining and also wet machining.

BRIEF DESCRIPTION OF THE DRAWINGS

Further details and advantages of the invention will be described hereafter on the basis of exemplary embodiments and with reference to the drawing.

DETAILED DESCRIPTION OF EMBODIMENTS OF THE INVENTION

Terms are used in conjunction with the present description that are also used in relevant publications and patents.

However, it is to be noted that the use of these terms is only to serve for better understanding. The inventive ideas and the scope of protection of the claims for protection are not to be restricted in the interpretation by the specific selection of the terms. The invention may readily be transferred to other term systems and/or technical fields. The terms are to be applied accordingly in other technical fields.

Rotationally-symmetrical, periodic structures are, for example, gearwheels (such as spur gears) having internal or external gear teeth. However, for example, these can also be brake disks, clutch or transmission elements, and the like. In particular, this relates to the production of pinion shafts, worms, gearwheel pumps, ring joint hubs (ring joints are used, for example, in the automotive sector to transmit the force from a differential to a vehicle wheel), spline shaft connections, sliding sleeves, belt pulleys, and the like. The periodic structures are also referred to here as periodically repeating structures.

Gearwheels, teeth, and tooth gaps are primarily discussed hereafter. However, the invention may also be transferred to other components having other periodic structures, as mentioned above. In these other components, this then does not relate to tooth gaps, but rather, for example, to grooves or channels.

The usage spectrum of the described deburring method is large and extends to the application in the production of greatly varying rotationally-symmetrical periodic structures.

The term "chamfering" is used for a procedure, during which edges of a workpiece 20 are chamfered and/or protruding burrs are deburred. These can be so-called face-side edges, as occur, for example, on the face side(s) of gearwheels.

Figure 1A:
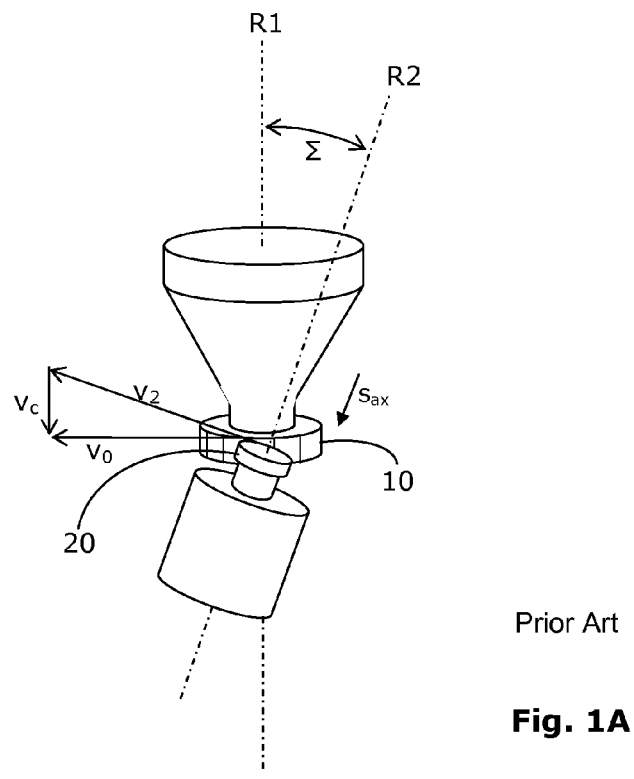
FIG. 1A shows a schematic illustration of a previously known straight-toothed skiving wheel having cylindrical external contour engaged with an externally-toothed workpiece during the power skiving.
Figure 1B:
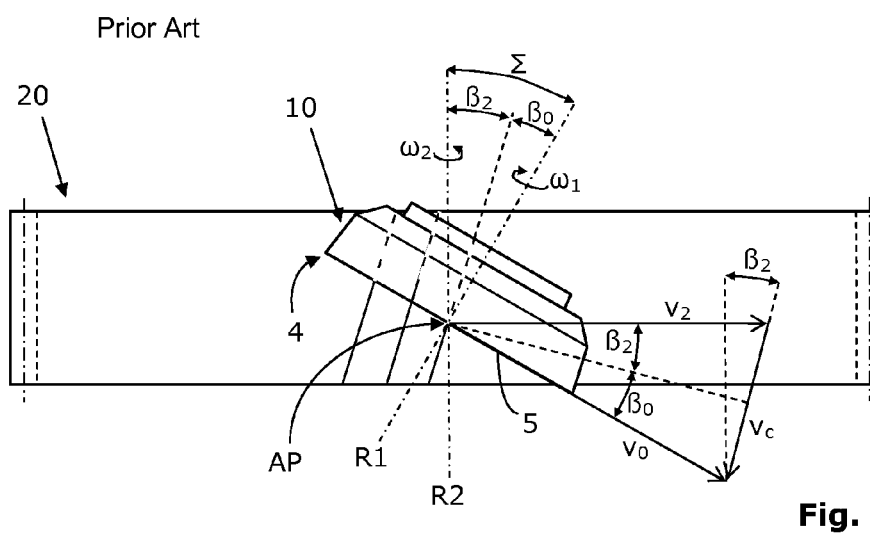
FIG. 1B shows a schematic illustration of a previously known helical-toothed skiving wheel having conical external contour engaged with an externally-toothed workpiece during the power skiving.
Figure 2:
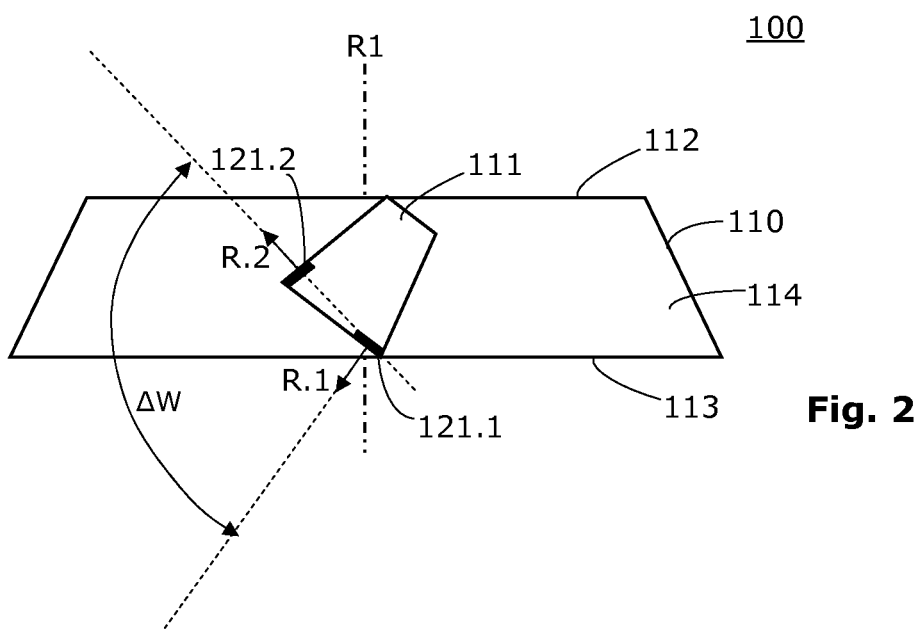
FIG. 2 shows a very schematic illustration of a first special tool having conical external contour, wherein a single cutting tooth is shown.

Reference is made hereafter to a special tool 100, which has the shape or design of a cutting wheel. FIG. 2 shows a first example of such a tool 100. This exemplary embodiment relates to a solid tool, in which the cutting teeth 111 are part of the tool 100. The power skiving tool 100 can have multiple cutting teeth 111, wherein only one cutting tooth 111 is provided in the exemplary embodiment shown in FIG. 2.

The cutting teeth 111 have either a trapezoidal or a triangular basic shape in a sectional plane in parallel to the axis R1 (which may be in a plane that is referred to here as the observation plane) according to FIG. 2, wherein this sectional plane intersects both rake faces 121.1 and 121.2. FIG. 2 shows a single cutting tooth 111 having trapezoidal basic shape. In practice, the actual three-dimensional shape of the cutting teeth 111 can also be more complex than shown in the figures here.

The main body 110 of the special tool 100 has, in the exemplary embodiment shown in FIG. 2, the shape of a truncated cone disk or a plate in the shape of a truncated cone. Reference is made hereafter to a special tool 100 similar to a cutting wheel.

The special tool 100 has at least one first rake face 121.1 and one second rake face 121.2 per cutting tooth 111, as shown in FIG. 2. That is to say, at least one first rake face 121.1 and one second rake face 121.2 are provided on each cutting tooth 111.

The following can be stated with reference to the location and orientation of the rake faces 121.1, 121.2, etc.:
the two rake faces 121.1, 121.2 (or the three rake faces 121.1, 121.2, 121.3, if the cutting tooth 111 has another basic shape) are each implemented in the region of different sides of the cutting tooth 111;
the normal directions R.1, R.2 of the two rake faces 121.1, 121.2 (or the normal directions R.1, R.2, R.3 of the three rake faces 121.1, 121.2, 121.3) are different;
the normal directions R.1, R.2 typically enclose an angle $\Delta W$, which is greater than 90° in an observation plane. This observation plane is a plane that is parallel to the axis R1 and goes through the cutting tooth reference point. This cutting tooth reference point is defined here as the "middle" of the cutting tooth. This observation plane is also used for the description of the trapezoidal basic shape or a triangular basic shape.

It can be seen in FIG. 2 that the single cutting tooth 111 is tilted in relation to the end faces 112, 113 of the main body 110. In the exemplary embodiment shown, the cutting tooth 111 was tilted by approximately 45° clockwise. The first rake face 121.1 is located here in the region of the end face 113, which can also be referred to as the "front side" of the special tool 100. The second rake face 121.2 has another orientation, as shown in FIG. 2. In FIG. 2, each of the normal directions R.1 and R.2 of the rake faces 121.1 and 121.2 are shown.

The cutting tooth or teeth 111 may be seated in certain embodiments on or in the region of a circumferential or lateral surface 114 of the main body 110.

Figure 3A:
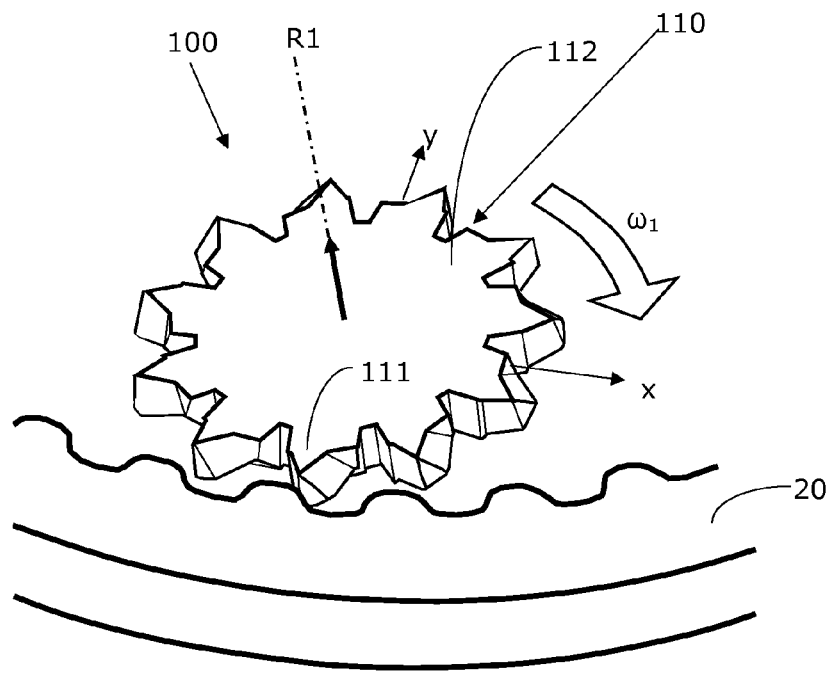
FIG. 3A shows a schematic perspective view of a special tool engaged with an internally-toothed workpiece during the face-side chamfering, similar to power skiving, of the right flanks of the internally-toothed workpiece.

FIG. 3A shows a further embodiment of a special tool 100 during the chamfering of the right flanks of an internally-toothed workpiece 20. The special tool 100 is used rotating to the right here (i.e., rotating clockwise). $\omega 1$ stands for the rotation around the axis R1. The chamfering of the right flanks is performed using a downwardly oriented cutting direction (the normal R.1 of the corresponding rake face 121.1 therefore points diagonally downward in FIG. 3B). The front side 113 of the tool 100 faces downward in FIG. 3A. The rear side 112 is visible in FIG. 3A. In the example shown, the first rake faces 121.1 are in the region of the front side 113 and are therefore not visible in FIG. 3A. In addition to the fact that in the case of the chamfering similar to power skiving, the axis intersection angle $\Sigma$ in the example shown is approximately 12°, the special tool 100 can be inclined away from the internal gear teeth to be machined, to create a clearance angle. The inclination away is optional.

The axis intersection angle $\Sigma$ of the tool axis R1 with the workpiece axis R2 may have an absolute value in the range between 10° and 30°.

Figure 3B:
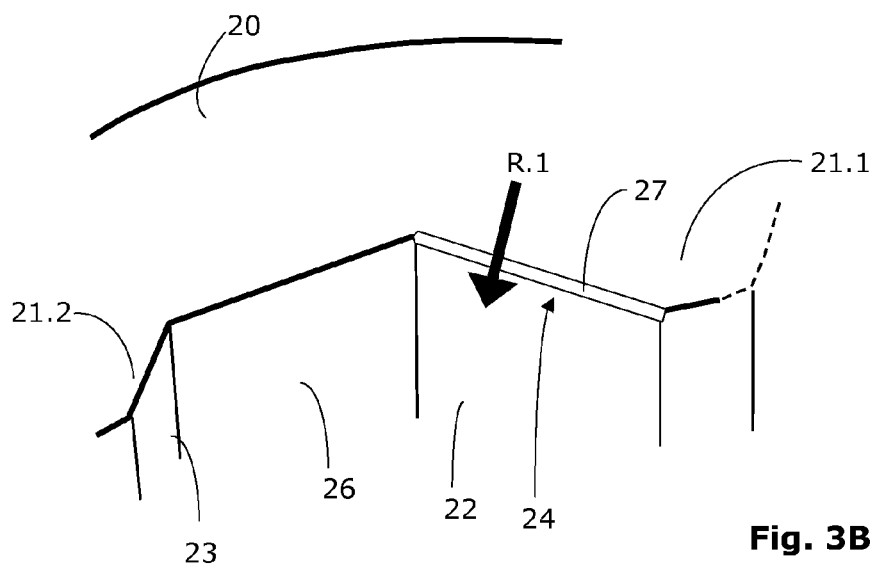
FIG. 3B shows a schematic perspective view of a portion of the internally-toothed workpiece of FIG. 3A, wherein the face-side chamfering of a right flank is illustrated by an arrow.

FIG. 3B shows a diagonal top view of an end side of a part of the internally-toothed workpiece 20 of FIG. 3A, wherein the viewing direction—in contrast to FIG. 3A—is oriented on the end side of the workpiece 20 diagonally from the rear. For the sake of better comprehensibility, the special tool 100 is not shown. The tooth base 26, the right flank 22, and the left flank 23 of a tooth gap are visible in FIG. 3B. In the view shown, a first tooth 21.1 of the workpiece 20 is seated on the right of the tooth gap. Where the right flank 22 merges into the end face, the edge 24 is located, which was chamfered by use of the methods herein. The corresponding chamfer 27 is schematically indicated in FIG. 3B. The chamfering of the right flank(s) 22 is performed in this exemplary embodiment, as already mentioned, using a cutting direction oriented downward. The normal direction R.1 of the rake face 121.1 used is illustrated by an arrow, which extends from top right to bottom left, in FIG. 3B. A chamfer 27 on the edge 24 having a chamfer angle of approximately 30° results in the specific case here.

Figure 3C:
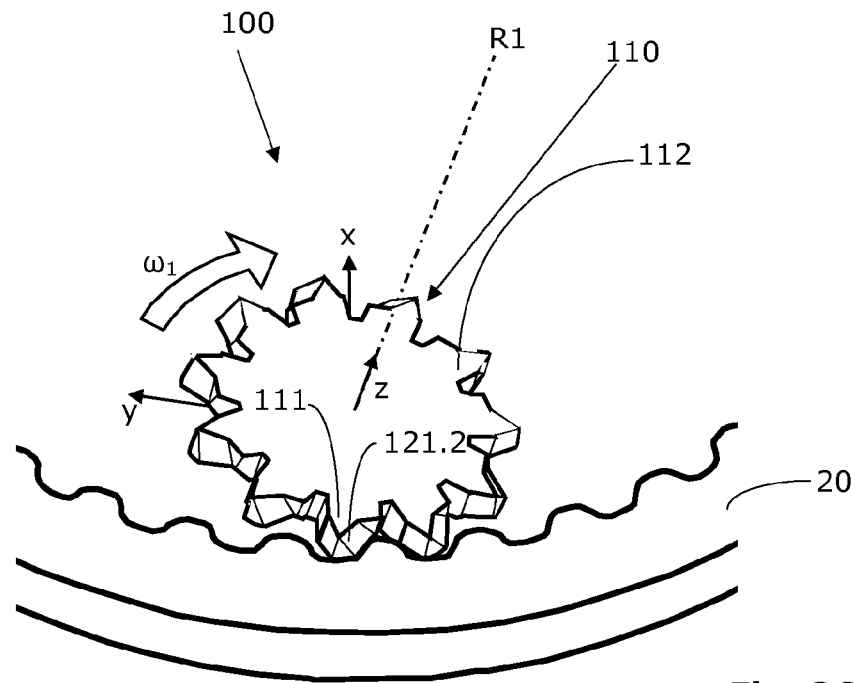
FIG. 3C shows a schematic perspective view of the special tool and the internally-toothed workpiece of FIG. 3A during the face-side chamfering, similar to power skiving, of the left flanks of the internally-toothed workpiece.

FIG. 3C shows the special tool 100 of FIG. 3A during the chamfering of the left flanks of the internally-toothed workpiece 20. The special tool 100 is again used rotating right here (i.e., rotating clockwise). The chamfering of the left flanks is performed using an upwardly oriented cutting direction. The front side 113 of the tool 100 faces downward in FIG. 3C. The rear side 112 is visible in FIG. 3C. In the second example, the second rake faces 121.2 are seated in the region of the rear side 112 of the tool 100. In addition to the fact that, in the case of the chamfering similar to power skiving, the axis intersection angle Σ in the example shown was now set to approximately −12°, the special tool 100 can optionally be inclined away from the internal gear teeth to be machined.

It is to be noted that the axis intersection angle Σ does not necessarily have to be equal in absolute value during the chamfering of the right and left flanks, as was the case in the embodiment of FIGS. 3A to 3D. The present machine settings during the chamfering of the right edges and during the chamfering of the left edges are predefined so that optimum cutting conditions result locally in each case.

Figure 3D:
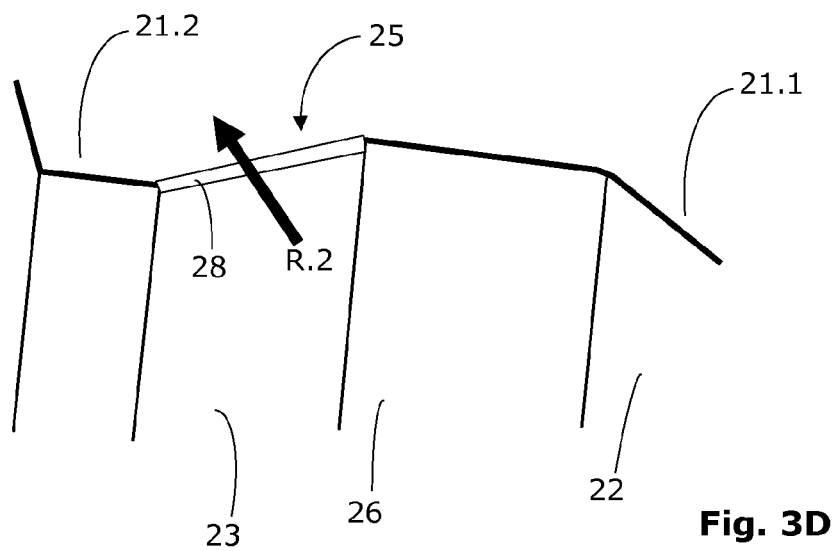
FIG. 3D shows a schematic perspective view of a portion of the internally-toothed workpiece of FIG. 3A, wherein the face-side chamfering of a left flank is illustrated by an arrow.

FIG. 3D shows a view of a tooth gap of the workpiece 20 of FIG. 3B. For the sake of better comprehensibility, the special tool 100 is not shown. In FIG. 3D, the tooth base 26, the right flank 22, and the left flank 23 of the tooth gap are visible. In the view shown, a second tooth 21.1 of the workpiece 20 is seated on the left of the tooth gap (the first tooth 21.1 can be seen on the right in the image). Where the left flank 23 merges into the end face, the edge 25 is located, which was chamfered by use of the methods disclosed herein. The chamfering of the left flank(s) 23 is performed in this exemplary embodiment, as already mentioned, using an upwardly oriented cutting direction. The corresponding normal direction R.2 is illustrated in FIG. 3D by an arrow and extends from bottom right to top left. In the specific case, a chamfer 28 results here on the edge 25 having a chamfer angle of approximately 30°.

Figure 4:
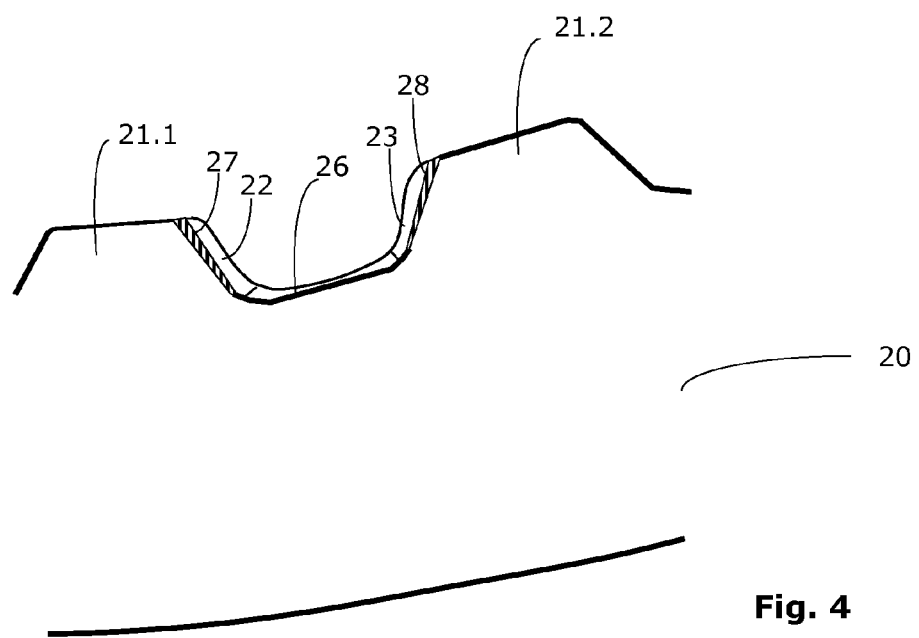
FIG. 4 shows a schematic perspective view of a portion of an internally-toothed workpiece after the chamfering of the right and left flanks.

FIG. 4 shows a schematic top view of a portion of an internally-toothed and chamfered workpiece 20. Two adjacent teeth 21.1 and a tooth gap between these two teeth can be seen in FIG. 4. The corresponding tooth gap is defined here by the tooth base 26 and the flanks 22 and 23. Where the edges 25, 26 were located, chamfers 27, 26 are now located. The chamfers 27, 28 are shown shaded here, such chamfers 27, 28 can be created, for example, using methods disclosed herein.

Figure 5:
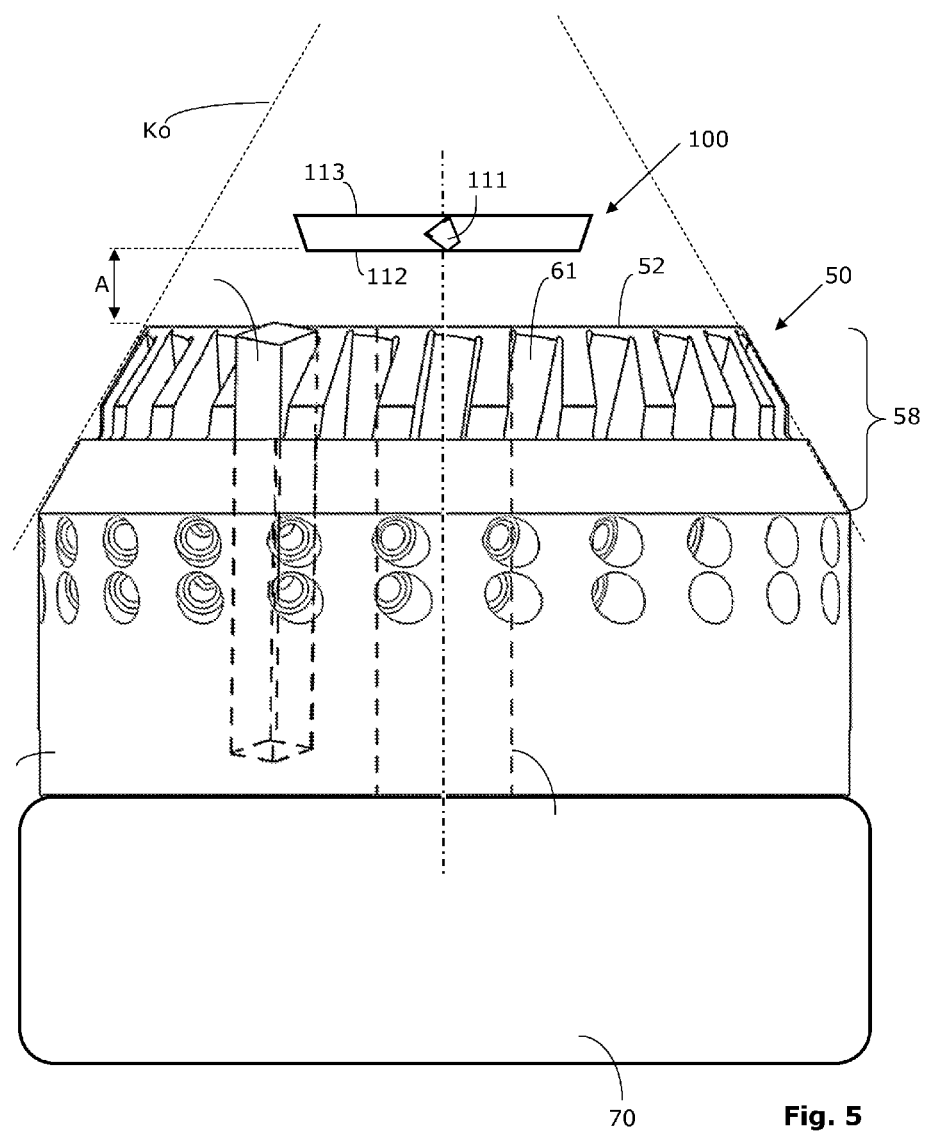
FIG. 5 shows a schematic side view of the main body of a gear cutting tool, which is equipped here with only one cutter bar as an example, wherein a special tool is arranged coaxially to the gear cutting tool in front of the gear cutting tool.

In some embodiments, the special tool 100 is seated concentrically in relation to the axis of rotation R1* of a gear cutting tool 50, as shown in FIG. 5 on the basis of an example.

FIG. 5 shows the jacket shape of the main body 51 of an exemplary gear cutting tool 50 in a schematic side view. The main body 51 is only equipped with one cutter bar 60 here. The part of the cutter bar 60 that is visible, because it protrudes out of the workpiece-side end face 52, or out of the conical section of the end part 58 of the main body 51, is shown using a solid line. The non-visible part of the cutter bar 60, i.e., the part that is seated in the interior of the main body 51 in a corresponding receptacle opening 61, is shown by means of a dashed line. The receptacle opening 61 has a shape in the interior of the main body 51 that approximately corresponds to the shape of the non-visible part of the cutter bar 60. This gear cutting tool 50 can have a central passage opening 53, for example, to be able to fasten the gear cutting tool 50 on a tool spindle 70 of a CNC machine. The tool spindle 70 is shown solely schematically in FIG. 5.

The special tool 100 is seated concentrically in relation to the axis of rotation R1* of the gear cutting tool 50 in the example of FIG. 5, i.e., R1=R1*. The special tool 100 is located here above the workpiece-side end face 52 of the gear cutting tool 50 and the rear face 112 of the special tool 100 faces in the direction of the workpiece-side end face 52.

The main body 110 of the special tool 100 may have a conicity that is opposite to the conicity of the end part 58 of the main body 51 of the gear cutting tool 50, as shown in FIG. 5.

To prevent a collision of the special tool 100 with the workpiece 20 in such a piggyback configuration, the shape, the size, and the position of the special tool 100 (spacing A to the end face 52) may be selected so that they lie inside a virtual cone Ko, which is indicated in FIG. 5 by dashed lines. In the example according to FIG. 5, this requirement is unambiguously met. The virtual cone Ko is defined here by the cone shape of the main body 51, wherein the cutter bars 60 are also enveloped in this virtual cone Ko.

In embodiments having a cone shape of the main body 51, the cutter bars 60 are enclosed as much as possible (seated deep in the receptacle opening 61) and, on the other hand, no collision occurs with the workpiece 20 to be machined.

The processing and secondary times can be significantly shortened by a piggyback configuration, as shown in FIG. 5, which is significant above all in the case of a mass production.

Such a piggyback configuration can be used above all together with a cutter head as described in German utility model DE202011050054U1.

As may be recognized by those of ordinary skill in the pertinent art based on the teachings herein, numerous changes and modifications may be made to the above-described and other embodiments of the present invention without departing from the spirit of the invention as defined in the claims. Accordingly, this detailed description of embodiments is to be taken in an illustrative, as opposed to a limiting sense.

What is claimed is:

1. A method for the face-side chamfering of gear teeth of a workpiece in a CNC-controlled multiaxis machine, comprising:
   providing a tool in the multiaxis machine, wherein the tool has at least one cutting tooth having a first rake face and a second rake face,
   driving the tool in a first rotational direction,
   executing first CNC-controlled relative movements in a first machine setting of the multiaxis machine while the tool rotates in the first rotational direction, wherein the first machine setting includes a first axis intersection angle of an axis of the tool with an axis of the workpiece, and chamfering only a first face-side edge of a first tooth of the gear teeth in said first machine setting using the first rake face of the tool, and
   executing second CNC-controlled relative movements in a second machine setting of the multiaxis machine that differs from the first machine setting while the tool rotates in the first rotational direction, wherein the second machine setting includes a second axis intersection angle of the axis of the tool with the axis of the workpiece that is different than the first axis intersection angle, and chamfering a second face-side edge of the first tooth or another tooth of the gear teeth in said second machine setting using the second rake face of the tool,
   wherein (i) the first face-side edge is an edge of a right flank and the second face-side edge is an edge of a left flank, or (ii) the first face-side edge is an edge of a left flank and the second face-side edge is an edge of a right flank.

2. The method according to claim 1, wherein the first and second CNC-controlled relative movements during chamfering of the first face-side edge and the second face-side edge are continuous movements, and one or more of the first axis intersection angle or the second axis intersection angle is predefined in absolute value in a range between 10° and 30°.

3. The method according to claim 1, wherein, during chamfering of the first face-side edge and the second face-side edge, radial plunging of the tool is executed on the workpiece, and, after said chamfering, the tool is moved out of the workpiece.

4. The method according to claim 1, wherein, during chamfering of the first face-side edge and the second face-side edge, plunging of the tool is executed on the workpiece together with an axial movement of the tool.

5. The method according to claim 1, wherein the tool defines a shape of a skiving wheel, and the at least one cutting tooth is located on a circumferential surface or lateral surface of the tool and defines a first rake face and a second rake face.

6. The method according to claim 1, wherein the at least one cutting tooth has a trapezoidal or a triangular basic shape in a sectional plane in parallel to an axis of rotation of the tool.

7. The method according to claim 1, wherein the tool forms a piggyback configuration together with a gear cutting tool, and said driving step follows gear cutting of the workpiece.

8. An apparatus configured to face-side chamfer gear teeth of a workpiece, comprising:
  a device configured for chucking on a tool spindle of a CNC-controlled multiaxis machine and including
    a gear cutting tool, and
    a special tool arranged coaxially to the gear cutting tool and seated in front of the gear cutting tool from a workpiece-side view point in the coaxial arrangement,
  wherein the special tool defines a shape of a cutting wheel and has at least one cutting tooth on a circumferential surface or lateral surface, the at least one cutting tooth having a first rake face and a second rake face; and
  wherein the CNC-controlled multiaxis machine is configured (a) to execute first CNC-controlled relative movements in a first machine setting configured to chamfer only a first face-side edge of a first tooth of the gear teeth while the tool rotates in a first rotational direction, wherein the first machine setting includes a first axis intersection angle of an axis of the tool with an axis of the workpiece, and wherein said first face-side edge is chamfered with the first rake face, and (b) to execute second CNC-controlled relative movements in a second machine setting that differs from the first machine setting while the tool rotates in the first rotational direction, wherein the second machine setting includes a second axis intersection angle of the axis of the tool with the axis of the workpiece that is different than the first axis intersection angle and is configured to chamfer a second face-side edge of the first tooth or another tooth of the gear teeth with the second rake face,
  wherein (i) the first face-side edge is an edge of a right flank and the second face-side edge is an edge of a left flank, or (ii) the first face-side edge is an edge of a left flank and the second face-side edge is an edge of a right flank.

9. The apparatus according to claim 8, wherein the gear cutting tool has a main body including a conical end part in a region of the body proximal to said workpiece, and the special tool is seated with a clearance in front of the conical end part of the gear cutting tool.

10. The apparatus according to claim 9, wherein the special tool defines a conical shape and a conicity of the special tool extends in a direction opposite to a direction of conicity of the conical end part of the gear cutting tool.

11. The method as defined in claim 1, further including, after the step of executing first CNC-controlled relative movements and before the step of executing second CNC-controlled relative movements, changing the first machine setting to the second machine setting.

\* \* \* \* \*